United States Patent [19]
Fujii

[11] Patent Number: 5,449,124
[45] Date of Patent: Sep. 12, 1995

[54] REEL LOCK MECHANISM FOR TAPE CASSETTE

[75] Inventor: Hiroshi Fujii, Tokyo, Japan

[73] Assignee: Sony Corporation, Japan

[21] Appl. No.: 151,029

[22] Filed: Nov. 12, 1993

[30] Foreign Application Priority Data

Nov. 19, 1992 [JP] Japan ................. 4-332165

[51] Int. Cl.⁶ ........................................... G11B 23/087
[52] U.S. Cl. ................. 242/338.3; 242/343.2; 360/132
[58] Field of Search ............... 242/338.3, 338.2, 343.2, 242/338.1, 343, 343.1, 326.1; 360/132; 352/78 R; 354/275

[56] References Cited

U.S. PATENT DOCUMENTS

| | | | |
|---|---|---|---|
| 4,022,401 | 5/1977 | Kishi | 242/338.3 |
| 4,513,929 | 4/1985 | Oishi et al. | 242/338.3 |
| 4,553,717 | 11/1985 | Takagi | 242/338.3 |
| 4,579,295 | 4/1986 | Harada | 242/338.3 |
| 4,585,187 | 4/1986 | Okamura et al. | 242/338.3 |
| 4,604,671 | 8/1986 | Oishi | 242/338.3 X |
| 4,631,619 | 12/1986 | Hashizume et al. | 242/338.3 X |
| 4,679,110 | 7/1987 | Schoettle et al. | 242/338.3 X |
| 4,903,915 | 2/1990 | Iwahashi | 242/338.3 |
| 5,146,380 | 9/1992 | Fujii et al. | 360/132 |

FOREIGN PATENT DOCUMENTS

| | | |
|---|---|---|
| 0111876 | 6/1984 | European Pat. Off. . |
| 0146311 | 6/1985 | European Pat. Off. . |
| 0153137 | 8/1985 | European Pat. Off. . |
| 0163293 | 12/1985 | European Pat. Off. . |
| 0179169 | 4/1986 | European Pat. Off. . |
| 411622A2 | 2/1991 | European Pat. Off. . |
| 2508223 | 12/1982 | France . |
| 3317566A1 | 12/1983 | Germany . |
| 4205038A1 | 9/1992 | Germany . |
| 61-210582 | 9/1986 | Japan . |
| 63-26877 | 2/1988 | Japan . |
| 2020628 | 11/1976 | United Kingdom . |
| 2044733 | 10/1980 | United Kingdom . |
| 2099400 | 12/1982 | United Kingdom . |
| 2114952 | 9/1983 | United Kingdom . |
| 2131769 | 6/1984 | United Kingdom . |
| 2192610 | 1/1988 | United Kingdom . |

OTHER PUBLICATIONS

EPO Search Report for EP 93402803.

*Primary Examiner*—John Q. Nguyen
*Attorney, Agent, or Firm*—Ronald P. Kananen

[57] ABSTRACT

A reel lock mechanism in a tape cassette locks a pair of tape reels against rotation to prevent a tape wound around the tape reels from being loosened. The reel lock mechanism has a reel lock assembly movable between a lock position to lock the tape reels against rotation and an unlock position to unlock the tape reels for rotation. The reel lock assembly includes a slider slidably supported in the tape cassette, a lock body having a pair of engaging members engageable with teeth on outer circumferential edges of the tape reels, and a twistable joint, the slider and the lock body being integrally connected to each other by the twistable joint. When one of the tape reels is turned in a direction to loosen the tape, one of the engaging members is displaced by one of the teeth on the one of the tape reels, twisting the joint to press the other engaging member against one of the teeth on the other tape reel for thereby turning the other tape reel in a direction to tension the tape.

9 Claims, 9 Drawing Sheets

REEL LOCK MECHANISM FOR TAPE CASSETTE

BACKGROUND OF THE INVENTION

1. Field of the Invention

The present invention relates to a reel lock mechanism for use in a tape cassette, and more particularly to a reel lock mechanism capable of reliably preventing a tape from becoming loose or slacked in a tape cassette.

2. Description of the Prior Art

Magnetic tape cassettes for use in video tape recorders (VTRs) or the like have a reel lock mechanism for preventing the magnetic tape from becoming loose or slacked when not in use.

Figure 7:
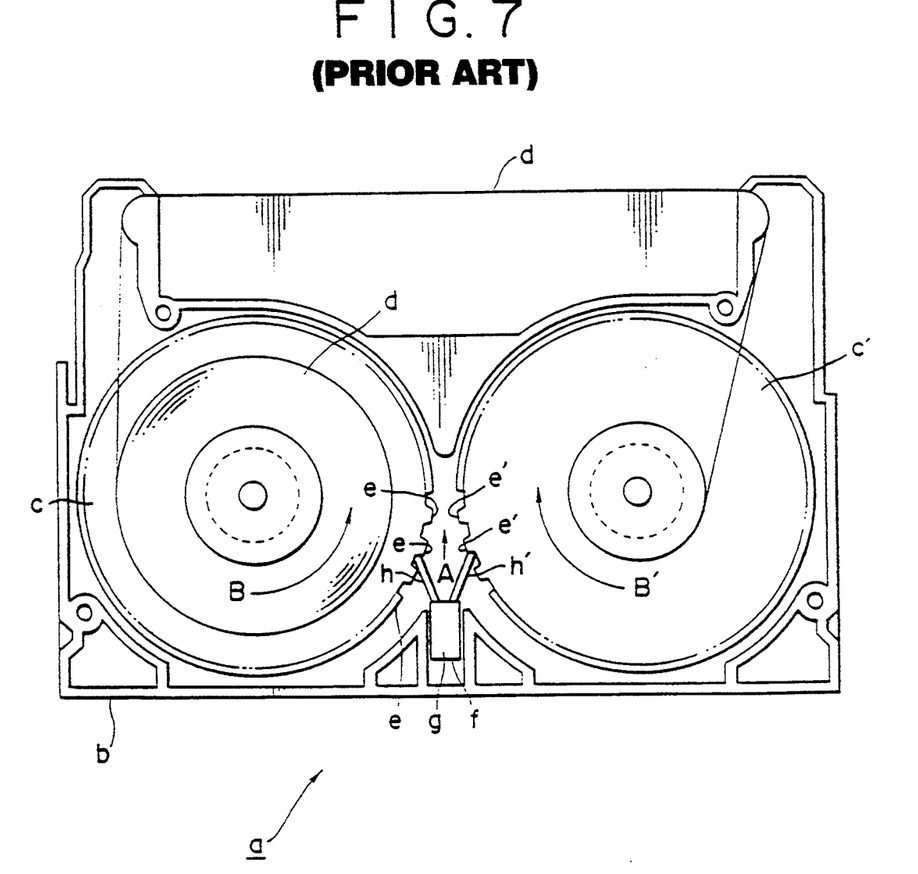
FIG. 7 is a plan view of a conventional reel lock mechanism.

FIG. 7 of the accompanying drawings shows one such reel lock mechanism a.

As shown in FIG. 7, a lower tape cassette member b supports a pair of tape supply and takeup reels with a magnetic tape d wound thereon, the tape supply and takeup reels having respective lower flanges c, c'. The lower flanges c, c' have series of teeth e, e', respectively, on their outer circumferential edges.

The reel lock mechanism a, which is incorporated in the lower tape cassette member b, has a reel lock assembly f positioned substantially between the tape supply and takeup reels. The reel lock assembly f comprises a main body g and a pair of lock fingers h, h' projecting from the main body g. The reel lock assembly f is normally urged in the direction indicated by the arrow A by a spring (not shown).

The lock fingers h, h' are made of a resilient material. The reel lock assembly f is urged in the direction A to keep the lock fingers h, h' in engagement with the respective teeth e, e' to lock the tape supply and takeup reels against rotation in one direction. More specifically, the lock fingers h, h' allow the flanges c, c' to rotate in the respective directions indicated by the arrows B, B', i.e., in the directions to keep the magnetic tape d under tension, but prevent the flanges c, c' from rotating in the opposite directions to cause the magnetic tape d to become loose or slacked.

Figure 8:
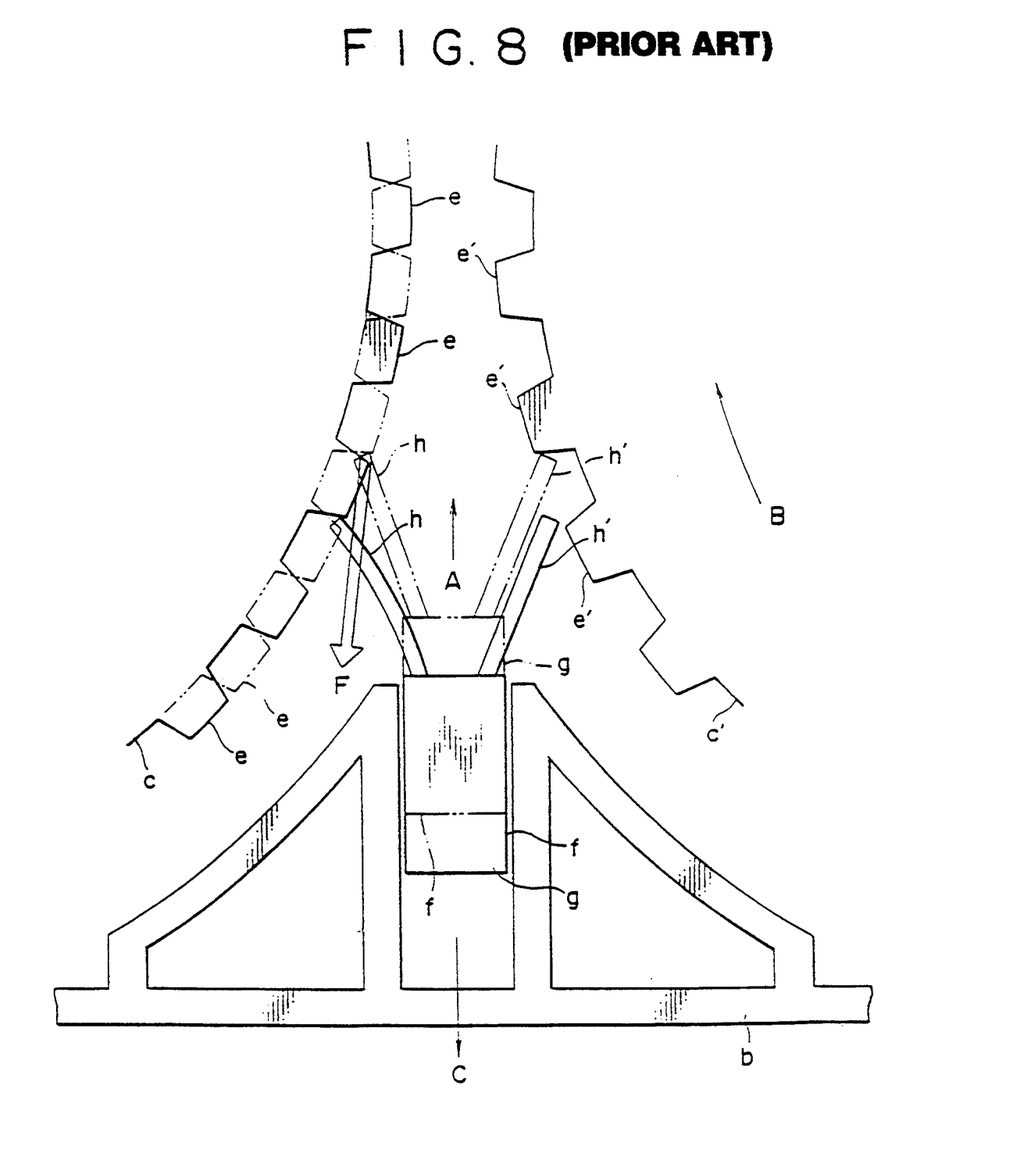
FIG. 8 is an enlarged fragmentary plan view showing a problem with the conventional reel lock mechanism.

When a force indicated by the arrow F in FIG. 8 of the accompanying drawings is applied to the supply reel flange c due to vibration or the like, the reel lock assembly f is displaced in the direction indicated by the arrow C, bringing the lock finger h' out of engagement with the teeth e' of the takeup reel flange c'. Since the tape takeup reel can now rotate in the direction to permit the magnetic tape d to become loose, the magnetic tape d tends to be loosened or slacked, and can possibly be jammed in the tape cassette.

Figure 9:
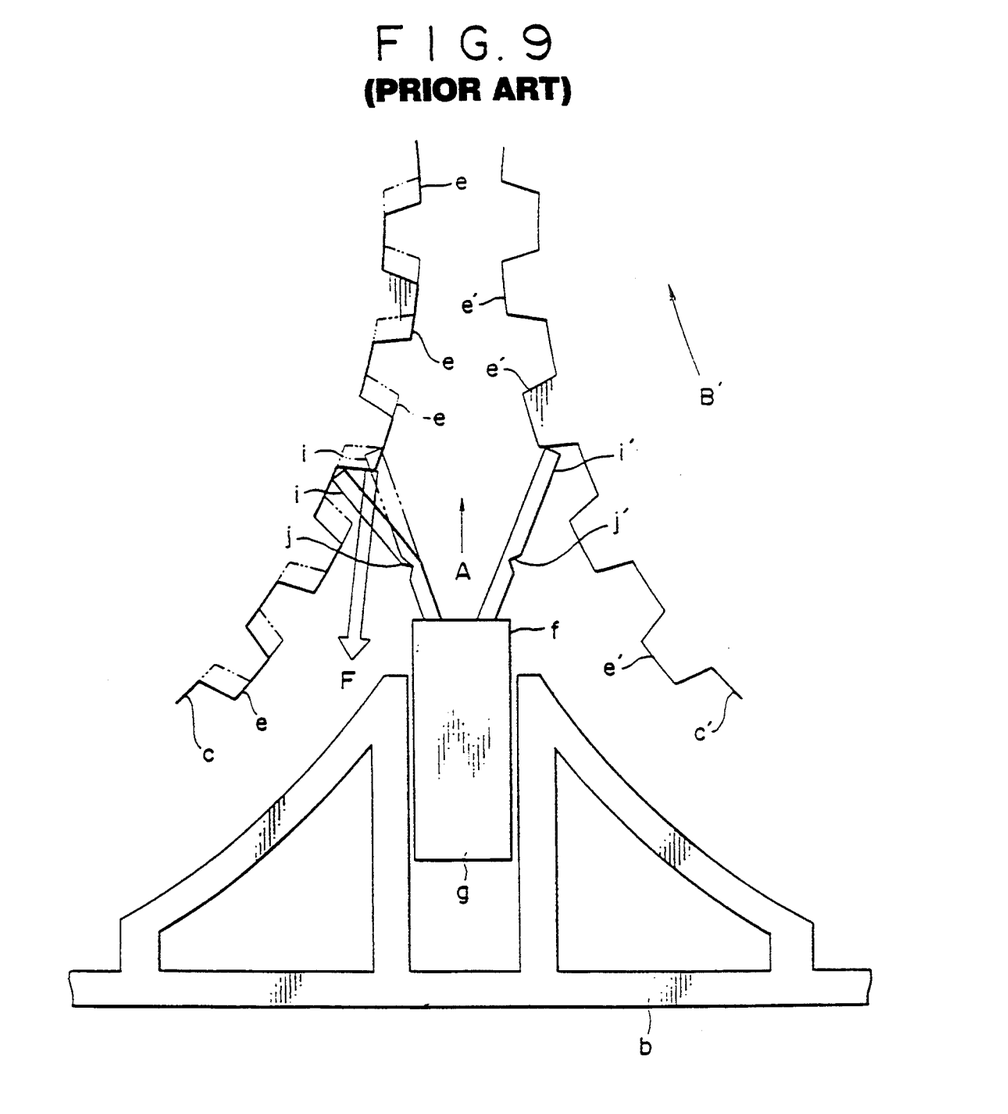
FIG. 9 is an enlarged fragmentary plan view of an improved conventional reel lock mechanism.

One solution is to employ a pair of lock fingers i, i' having respective notches j, j', as shown in FIG. 9 of the accompanying drawings. When the force F is imposed on the supply reel flange c, the lock finger i is bent at the notch j, releasing the force F. Therefore, the reel lock assembly f is not displaced, and the lock finger i' remains in engagement with the teeth e' of the takeup reel flange c'. However, since the notches j, j' make the lock fingers i, i' mechanically weak, the lock fingers i, i' may be forcibly bent out of engagement with the teeth e, e' depending on the magnitude of the force applied to the tape supply and takeup reels.

Figure 10:
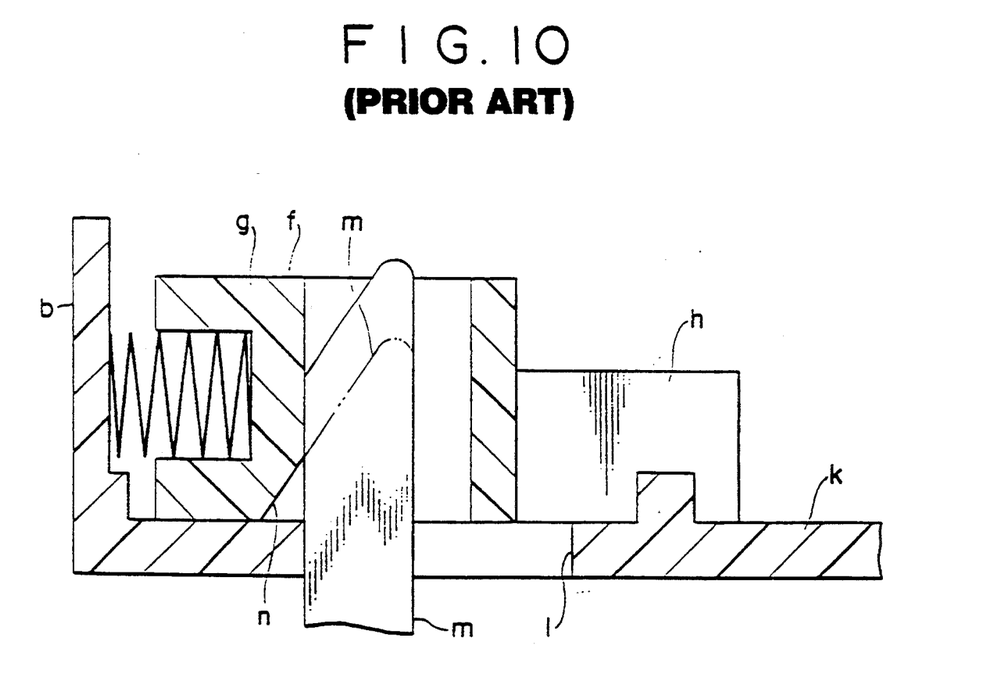
FIG. 10 is a fragmentary crosssectional view showing other problems with the conventional reel lock mechanism.

As shown in FIG. 10 of the accompanying drawings, an unlock arm m is inserted through a hole 1 defined in a bottom wall k of the lower tape cassette member b. When the unlock arm m is inserted into the main body g and engages and laterally pushes a cam surface n of the main body g, the reel lock assembly f is displaced to unlock the lock fingers h, h' from the respective teeth e, e'. The greater the distance that the reel lock assembly f is displaced, the more reliably the lock fingers h, h' can be locked on and unlocked from the respective teeth e, e'. The distance that the reel lock assembly f is displaced may be increased by increasing the stroke that the unlock arm m is inserted into the main body g. However, an increase in the stroke of insertion of the unlock arm m into the main body g results in an increase in the distance that the magnetic tape cassette has to move when it is loaded into a video tape recorder. Another way of increasing the distance that the reel lock assembly f is displaced is to increase the angle by which the cam surface n is inclined. This attempt is not preferable as it will cause the cam surface n to be scraped off when the cam surface n is repeatedly engaged by the unlock arm m.

SUMMARY OF THE INVENTION

It is an object of the present invention to provide a reel lock mechanism which can keep a tape under suitable tension at all times against being jammed in a tape cassette.

According to the present invention, there is provided a reel lock mechanism for locking a pair of tape reels against rotation in a tape cassette to prevent a tape wound around the tape reels from being loosened, comprising a reel lock assembly movable between a lock position to lock the tape reels against rotation and an unlock position to unlock the tape reels for rotation, the reel lock assembly comprising a slider slidably supported in the tape cassette, a lock body having a pair of engaging members engageable with teeth on outer circumferential edges of the tape reels, and a twistable joint; the slider and the lock body being integrally connected to each other by the twistable joint, the arrangement being such that when one of the tape reels is turned in a direction to loosen the tape, one of the engaging members is displaced by one of the teeth on the one of the tape reels, twisting the joint to press the other engaging member against one of the teeth on the other tape reel for thereby turning the other tape reel in a direction to tension the tape.

When one of the tape reels is turned in a direction to loosen the tape, one of the engaging members is displaced by one of the teeth on the one of the tape reels, twisting the joint to press the other engaging member against one of the teeth on the other tape reel for thereby turning the other tape reel in a direction to tension the tape. Therefore, even when one of the tape reels is turned due to vibrations or shocks, the other tape reel remains locked by the reel lock mechanism, placing the tape under tension at all times. The tape is thus prevented from becoming loose or jammed.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
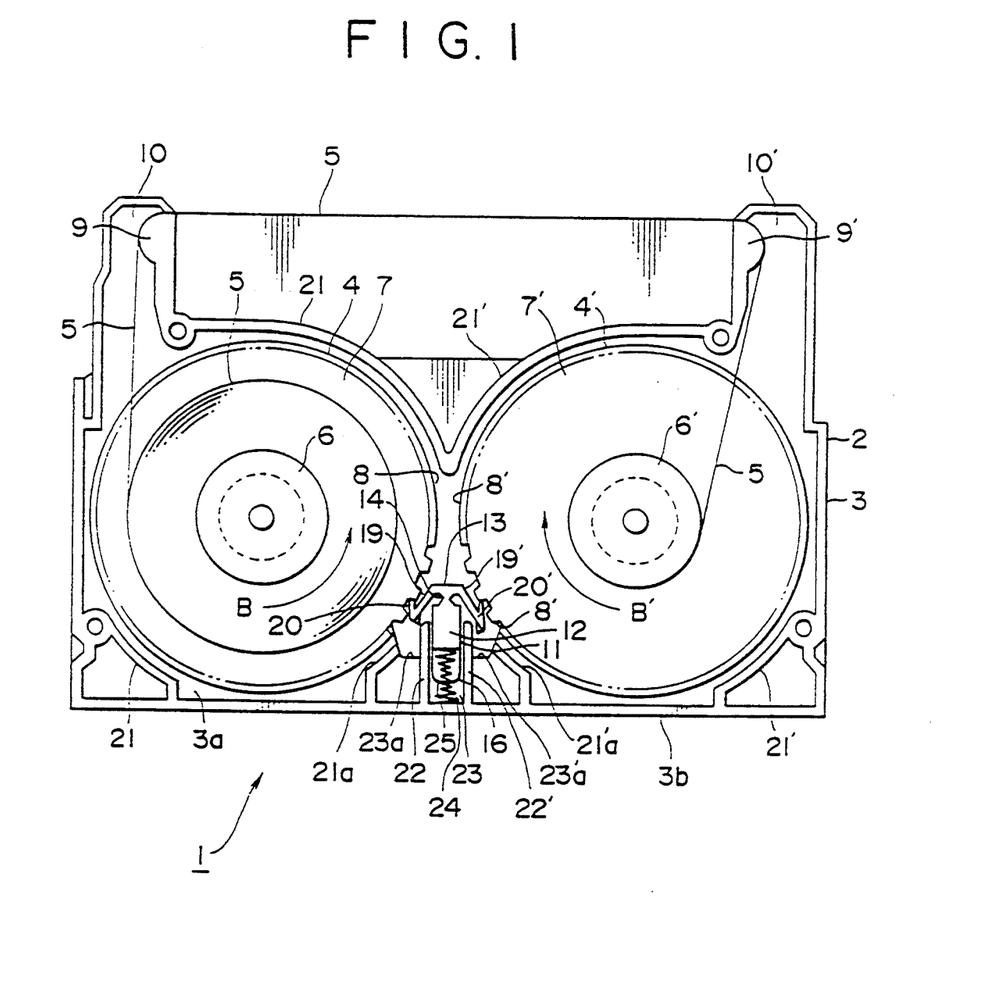
FIG. 1 is a plan view of a reel lock mechanism in a tape cassette according to the present invention.

As shown in FIG. 1, a reel lock mechanism 1 according to the present invention is incorporated in a magnetic tape cassette 2 for use in a video tape recorder (not shown). The magnetic tape cassette 2 includes a lower tape cassette member 3 in which a pair of tape supply and takeup reels 4, 4' is rotatably housed.

The tape supply and takeup reels 4, 4' have respective reel hubs 6, 6' with a magnetic tape 5 wound thereon and a pair of reel flanges 7, 7' (only lower flanges are shown). The lower flanges 7, 7' have series of teeth 8, 8', respectively, on their outer circumferential edges.

The magnetic tape 5 which is unwound from the tape supply reel 4 is guided by a tape guide 9 to go out of the magnetic tape cassette 2 through an opening 10, then enters into the magnetic tape cassette 2 through an opening 10', and is guided by a tape guide 9' and wound on the tape takeup reel 4'. A length of the magnetic tape 5 is exposed in a front portion of the magnetic tape cassette 2 which extends between the openings 10, 10'.

Figure 2:
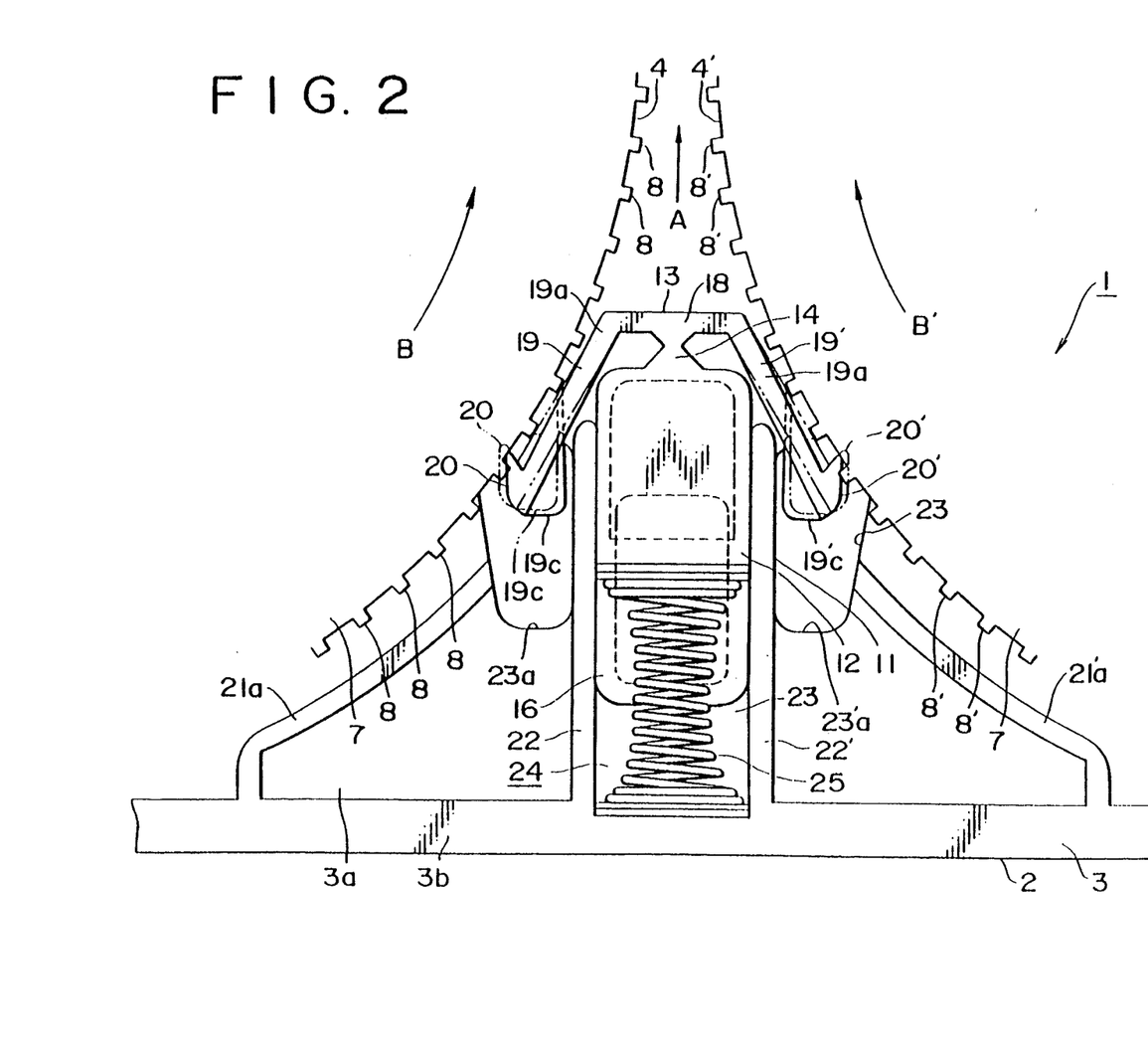
FIG. 2 is an enlarged fragmentary plan view of the reel lock mechanism.

As shown in FIGS. 1 and 2, the reel lock mechanism 1 has a reel lock assembly 11 positioned substantially between the tape supply and takeup reels 4, 4'. The reel lock assembly comprises a slider 12, a lock body 13, and a twistable joint 14 which interconnects the slider 12 and the lock body 13 at upper ends thereof. The slider 12, the lock body 13, and the joint 14 are integrally molded of a resiliently flexible synthetic resin material.

Figure 4:
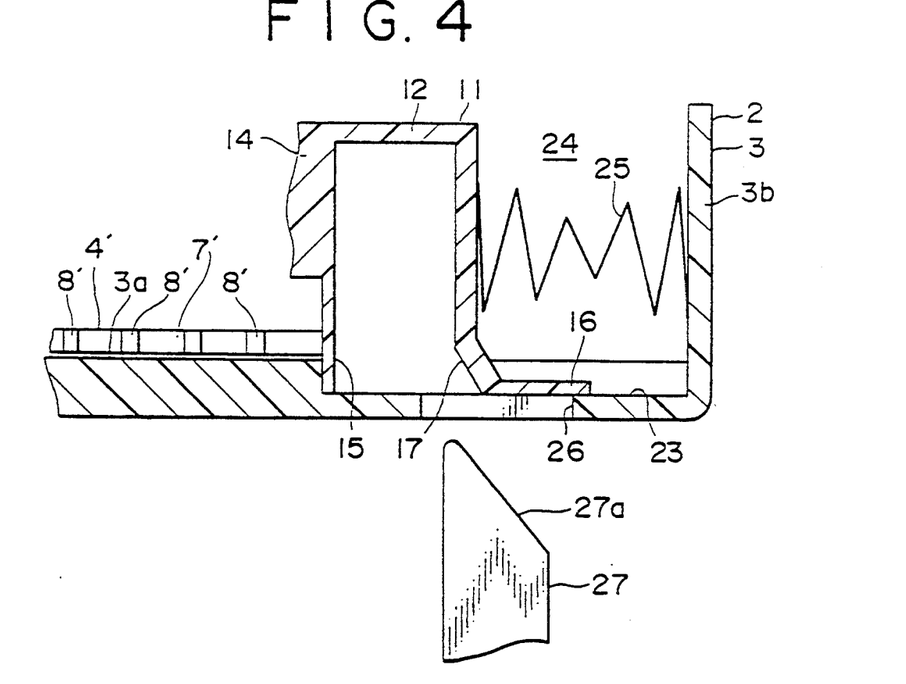
FIG. 4 is an enlarged fragmentary cross-sectional view of the reel lock mechanism before being unlocked.
Figure 5:
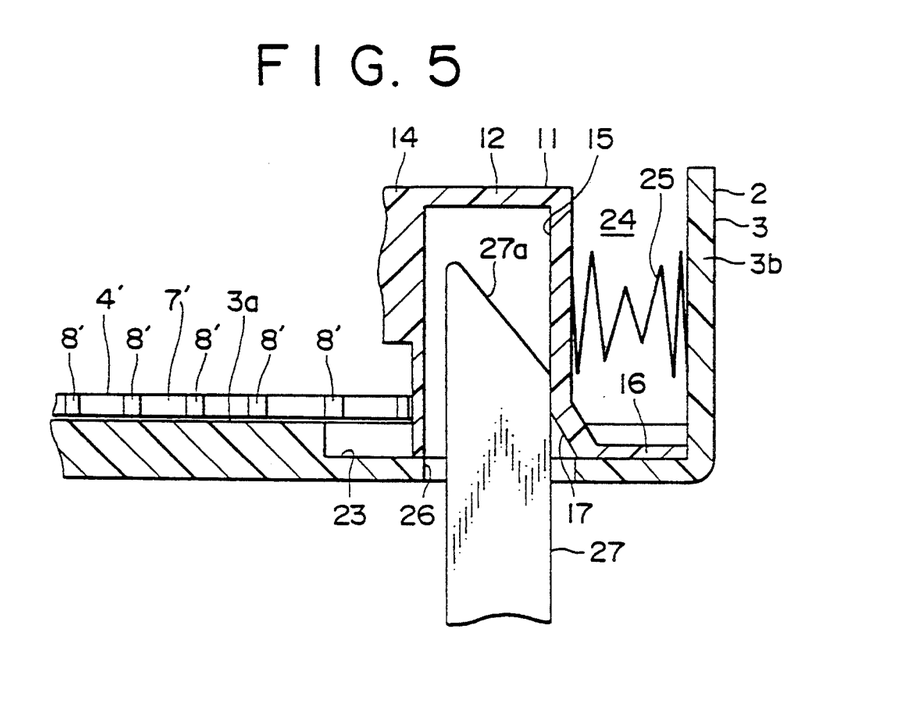
FIG. 5 is an enlarged fragmentary cross-sectional view of the reel lock mechanism after being unlocked.

The slider 12 is in the form of a rectangular parallelepiped elongate in a direction normal to the line interconnecting the centers of the tape supply and takeup reels 4, 4'. The slider 12 has a downwardly open recess 15 (see FIGS. 4 and 5) defined therein and a tongue 16 rearwardly projecting from the lower end of a rear end surface (lower end surface shown in FIGS. 1 and 2) thereof. As shown in FIGS. 4 and 5, the recess 15 is partly defined by a rear wall including a lower cam surface 17 that is inclined upwardly in the forward direction.

Figure 3:
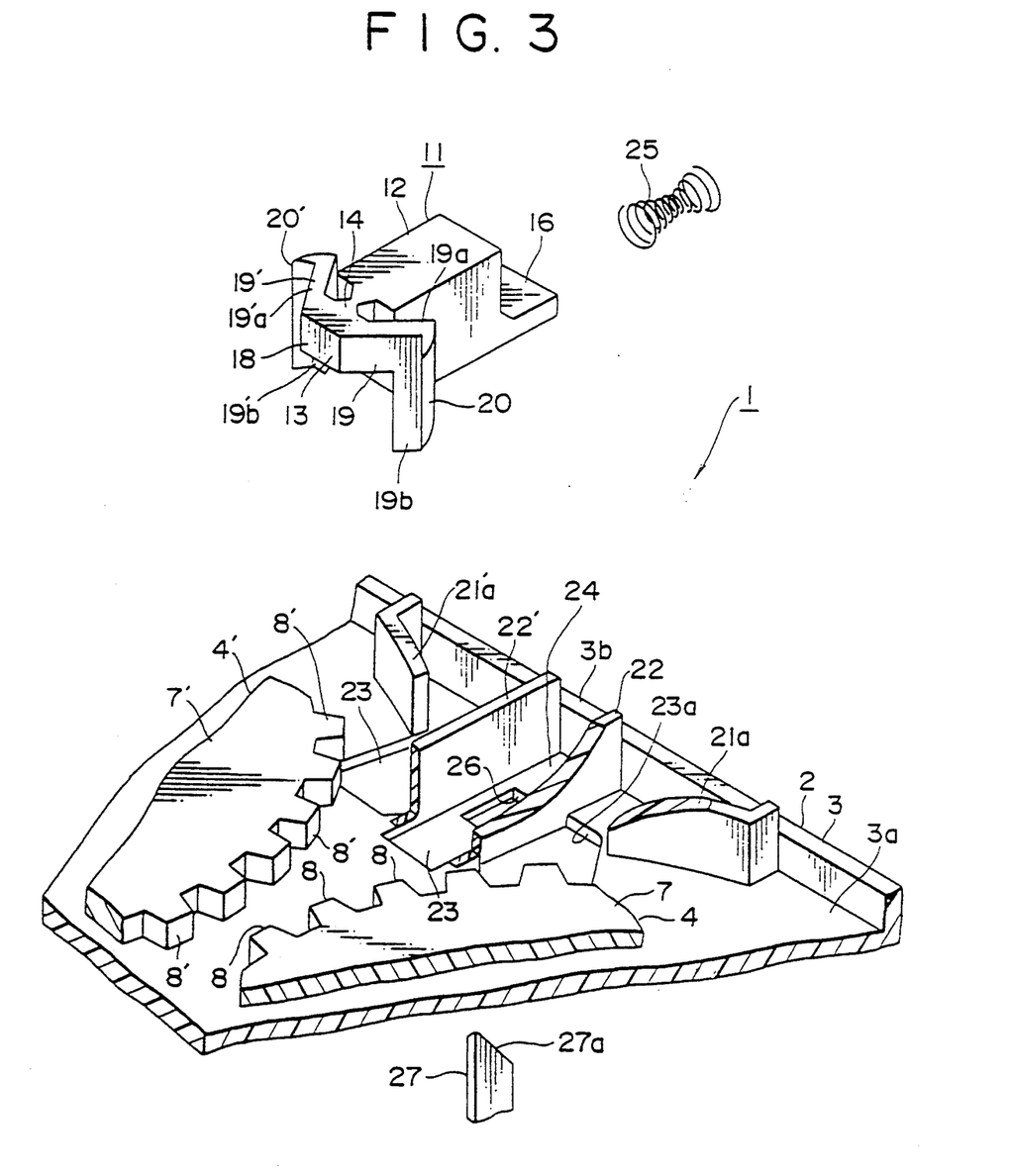
FIG. 3 is an enlarged fragmentary exploded perspective view of the reel lock mechanism.

The joint 14 is positioned between and integrally joined to a front end of the slider 12 and the central portion of the lock body 13. The joint 14 is shaped as a thin constricted member that can be flexibly twisted to allow the lock body 13 to rock with respect to the slider 12.

The lock body 13 comprises an intermediate portion 18 directly joined to the joint 14 and a pair of lock arms 19, 19' integrally coupled to and extending obliquely in opposite directions from respective opposite ends of the intermediate potion 18 in a substantially chevron pattern.

As shown in FIGS. 2 and 3, the lock arms 19, 19' comprise respective upper portions 19a, 19'a extending obliquely rearwardly from the intermediate portion 18 and respective vertical portions 19b, 19'b integral with and extending downwardly from respective rear ends of the upper portions 19a, 19'a. The lock arms 19, 19' also include respective engaging ridges 20, 20' integral with and projecting obliquely forwardly from rear edges of the upper portions 19a, 19'a and the vertical portions 19b, 19'b. The engaging ridges 20, 20' serve to engage the teeth 8, 8' of the lower flanges 7, 7'. As a whole, the lock body 13 is of a substantially W shape as viewed in plan.

The lock arms 19, 19' further have respective abutment members 19c, 19'c projecting rearwardly from respective lower ends of the vertical portions 19b, 19'b.

The intermediate portion 18 of the lock body 13 has a rear surface integrally joined at its central area to the joint 14.

The tape takeup and supply reels 4, 4' are disposed in respective spaces that are defined on a bottom wall 3a of the lower tape cassette member 3 by ribs 21, 21' projecting upwardly from the bottom wall 3 and positioned in substantially circular patterns that are slightly larger in diameter than the lower flanges 7, 7'.

Vertical walls 21a, 21'a each having an arcuate surface are disposed on the bottom wall 3a and have ends joined to an intermediate portion of a rear wall 3b of the lower tape cassette member 3 remote from the front portion thereof. Vertical walls 22, 22' parallel to each other are also disposed on the bottom wall 3a between the vertical walls 21a, 21'a, the vertical walls 22, 22' extending from the rear wall 3b toward the front portion of the lower tape cassette member 3 and being lower than the upper portions 19a, 19'a of the lock arms 19, 19'.

A recess 23 is defined in an upper surface of the bottom wall 3a in a region including the vertical walls 21a, 21'a, 22, 22', the recess 23 having an upper surface lower than the other upper surface of the bottom wall 3a.

The vertical wall 22, 22', the bottom wall 3a, and the rear wall 3b jointly define a space 24 in which the slider 12 is disposed on the upper surface of the recess 23 for sliding movement in a direction normal to the rear wall 3b while being guided by the vertical walls 22, 22'.

A coil spring 25, which is substantially spool-shaped with larger-diameter opposite ends and a smaller-diameter central portion, has one end resiliently held against the rear end of the slider 12 and the other end resiliently held against a portion of the rear wall 3b which is positioned in the space 24. The reel lock assembly 11 is normally urged to move forwardly, i.e., away from the rear wall 3b, into a lock position under the resilient force of the coil spring 25 with the engaging ridges 20, 20' engaging the teeth 8 of the lower flanges 7, 7', thus locking the tape supply and takeup reels 4, 4' against rotation.

The bottom wall 3a has an unlock hole 26 defined therein below the space 24. When the magnetic tape cassette 2 is loaded into the video tape recorder, an unlock pin 27 (see FIGS. 4 and 5) of the video tape recorder is inserted through the unlock hole 26 into the recess 15. At this time, a forwardly slanted surface 27a on a rear surface of the upper end of the unlock pin 27 engages and pushes rearwardly the cam surface 17 of the reel lock assembly 11. The reel lock assembly 11 is now displaced into an unlock position rearwardly against the bias of the coil spring 25, thereby moving the engaging ridges 20, 20' out of engagement with the teeth 8, 8'.

When the reel lock assembly 11 is thus displaced toward the unlock position, even if the lock body 13 is tilted, i.e., even if the lock arms 19, 19' are staggered relatively to each other in the direction normal to the rear wall 3b, the abutment member 19c or 19'c of the lock arm 19 or 19' which is positioned rearwardly of the other abutment member is first brought into a rear end 23a or 23'a of the recess 23. Upon further movement of the reel lock assembly 11 toward the unlock position, the lock arm 19 or 19' held against the rear end 23a or 23'a is pressed forwardly thereby, turning the lock body 13 about the joint 14. Therefore, both the engaging ridges 20, 20' are reliably released from the teeth 8, 8'.

The region where the reel lock assembly 11 is located includes the recess 23 whose surface is lower than the other surface of the bottom wall 3a. Therefore, when the magnetic tape cassette 2 is lowered the same distance upon being loaded, the effective stroke of movement of the unlock pin 27 is larger than if the reel lock assembly 11 were located on the same level as the other surface of the bottom wall 3a. Consequently, the distance that the reel lock assembly 11 moves can be increased by increasing the length of the cam surface 17 or the slanted surface 27a without varying the angle of inclination of the cam surface 17, so that the tape supply and takeup reels 4, 4' can be locked and unlocked reliably.

The magnetic tape 5 is prevented by the reel lock assembly 11 from becoming loosened or slacked as follows:

When the magnetic tape cassette 2 is not in use, the reel lock assembly 1 is urged forwardly in the direction indicated by the arrow A in FIG. 2 under the bias of the coil spring 25. The lock arms 19, 19' are resiliently flexed slightly rearwardly from their free state indicated by the two-dot-and-dash lines into a position indicated by the solid lines where the engaging ridges 20, 20' engage the teeth 8, 8' of the lower flanges 7, 7'.

Therefore, the lower flanges 7, 7' are urged to turn in the directions indicated by the arrows B, B', i.e., in the directions to increase the tension of the magnetic tape 5, under the resilient recovery forces from the lock arms 19, 19'. Stated otherwise, the lower flanges 7, 7' are prevented from being turned in the directions opposite to the directions B, B'.

It is assumed that the tape cassette 2 is vibrated or shocked, applying forces tending to turn at least one of the tape supply and takeup reels 4, 4' in a direction to loosen the magnetic tape 2, e.g., to turn the tape supply reel 4 in the direction indicated by the arrow ·B (see FIG. 6), which is opposite to the direction B, imposing a force indicated by the arrow F on the lock arm 19.

Figure 6:
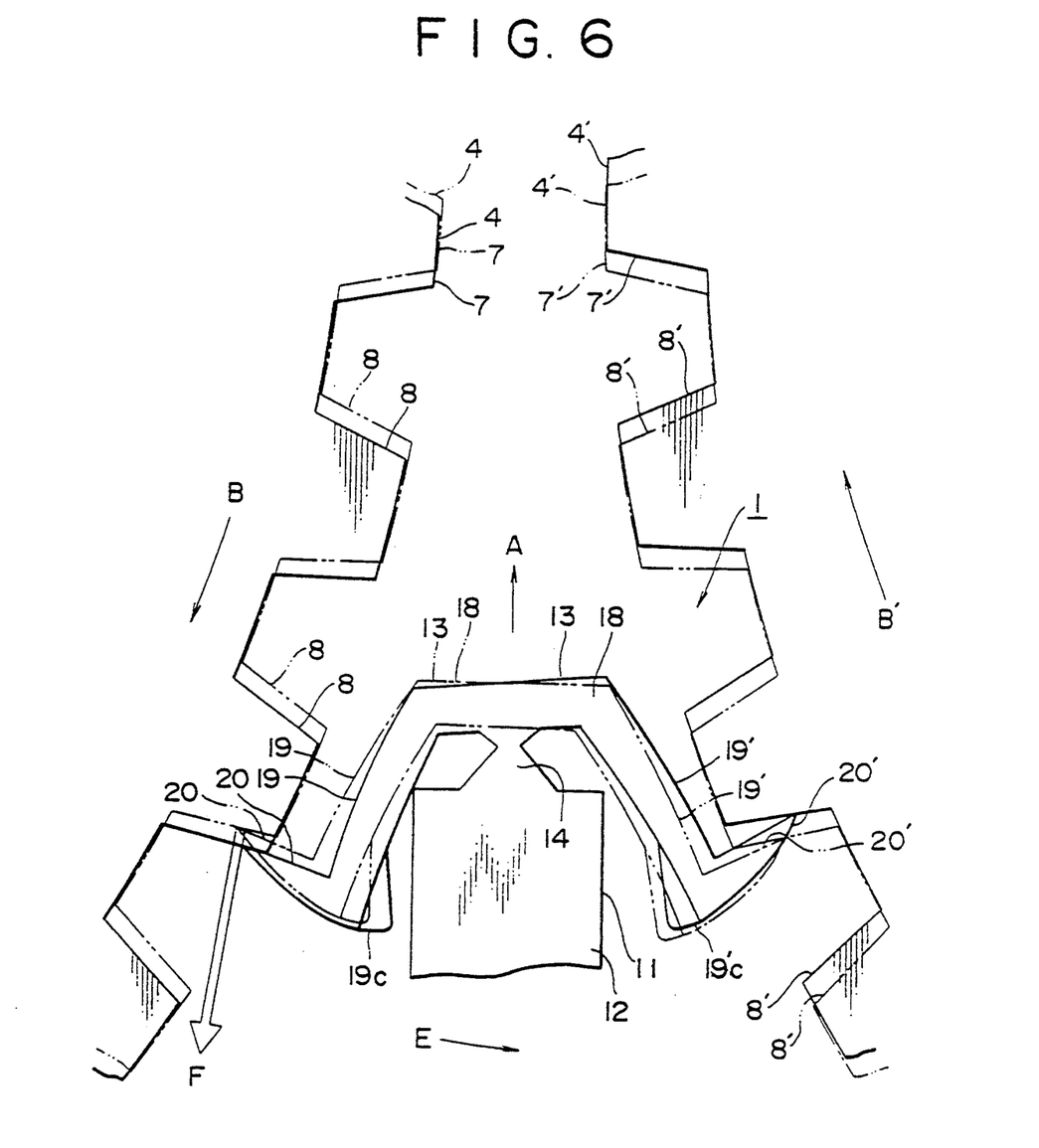
FIG. 6 is an enlarged fragmentary plan view illustrative of the manner in which a reel lock assembly operates.

The application of the force F to the lock arm 19 displaces the engaging ridge 20 in the direction indicated by the arrow E, whereupon the lock body 13 is turned counterclockwise about the joint 14 that is flexibly twisted.

As the lock body 13 is turned counterclockwise, the lock arm 19' is also angularly displaced counterclockwise, pressing the engaging ridge 20' against one of the teeth 8' of the lower flange 7'. Thus, the lower flange 7' is subjected to a force tending to turn itself in the direction B'.

Therefore, the magnetic tape 5 undergoes a force tending to increase its tension, and hence is prevented from becoming loosened or slacked.

As described above, even when one of the reel flanges 7, 7' is turned due to vibrations or shocks, the lock body 13 is turned about the joint 14 thereby preventing the other reel flange from being unlocked from the reel lock assembly 11. Since the lock body 13 applies a force to turn the other reel flange in the direction to tension the magnetic tape 5, the magnetic tape 5 is prevented from being loosened or slacked, and hence becoming jammed in the magnetic tape cassette 2.

The reel lock assembly 11 is made up of a relatively small number of parts as the lock body 13 and the slider 12 are formed integrally with each other.

In as much as the upper surface of the recess 23 where the reel lock assembly 11 is located is lower than the other upper surface of the bottom wall 3a, the distance that the reel lock assembly 11 is displaced is relatively large, allowing the tape supply and takeup reels 4, 4' to be locked and unlocked reliably even if the stroke of insertion of the unlock pin 27 remains unchanged.

Although a certain preferred embodiment of the present invention has been shown and described in detail, it should be understood that various changes and modifications may be made therein without departing from the scope of the appended claims.

What is claimed is:

1. A reel lock mechanism for locking a pair of tape reels against rotation in a tape cassette to prevent a tape wound around and extending between the tape reels from being loosened, said reel lock mechanism comprising:

a reel lock assembly movable between said reels in a forward direction towards said reels to a lock position to lock the tape reels against rotation and in a rearward direction away from said reels to an unlock position to unlock the tape reels for rotation, said forward and rearward directions being substantially perpendicular to the axes of rotation of the tape reels;

said reel lock assembly comprising:

a slider slidably supported in the tape cassette for sliding movement in said directions between said lock and unlock positions, said slider having a front surface and a width across said front surface;

a lock body having a central portion and a pair of lock arms integrally coupled to and extending from said central portion, said lock arms having respective engaging members joined thereto that are respectively engageable with teeth on outer circumferential edges of the tape reels, said central portion having a rear surface; and a twistable joint positioned between said rear surface of said central portion and said front surface of said slider and extending in a direction substantially parallel to the directions of said sliding movement, said slider and said lock body being integrally joined to each other by said twistable joint, said twistable joint having a constricted width that is substantially narrower than the width of said front surface of said slider to allow the lock body to rock with respect to the slider about an axis substantially parallel to said axes;

wherein, in the lock position, when one of the tape reels is turned in a direction to loosen the tape, the corresponding engaging member is displaced by one of the teeth on said one of the tape reels, twisting said joint to press the other engaging member against one of the teeth on the other tape reel for thereby turning the other tape reel in a direction to tension the tape.

2. A reel lock mechanism according to claim 1, wherein said reel lock assembly includes a coil spring acting on said slider for normally urging the slider in a direction toward said lock position.

3. A reel lock mechanism according to claim 1, wherein said lock arms extend obliquely relative to each other and rearwardly from said intermediate portion, said lock arms including respective upper portions and respective vertical portions extending from the upper portions, respectively, said engaging members comprising respective vertical ridges projecting obliquely relative to each other and forwardly from said upper and vertical portions.

4. A tape cassette assembly comprising:
a tape cassette having a bottom wall and a pair of tape reels rotatably mounted about respective axes substantially perpendicular to said bottom wall;
a reel lock mechanism for locking said pair of tape reels against rotation in the tape cassette to prevent a tape wound around and extending between the tape reels from being loosened, said reel lock mechanism comprising:
a reel lock assembly movable between said reels in a forward direction towards said reels to a lock position to lock the tape reels against rotation and in a rearward direction away from said reels to an unlock position to unlock the tape reels for rotation;
said reel lock assembly comprising:
a slider slidably supported on said bottom wall in the tape cassette for sliding movement in said directions between said lock and unlock positions, said slider having a front surface and a width across said front surface;
a lock body having a central portion and a pair of lock arms integrally coupled to and extending from said central portion, said lock arms having respective engaging members joined thereto that are respectively engageable with teeth on outer circumferential edges of the tape reels, said central portion having a rear surface; and
a twistable joint positioned between said rear surface of said central portion and said front surface of said slider and extending in a direction substantially parallel to the directions of said sliding movement, said slider and said lock body being integrally joined to each other by said twistable joint, said twistable joint having a constricted width that is substantially narrower than the width of said front surface of said slider to allow the lock body to rock with respect to the slider about an axis substantially perpendicular to said bottom wall;
wherein, in said lock position, when one of the tape reels is turned in a direction to loosen the tape, the corresponding engaging member is displaced by one of the teeth on said one of the tape reels, twisting said joint to press the other engaging member against one of the teeth on the other tape reel for thereby turning the other tape reel in a direction to tension the tape.

5. A tape cassette assembly according to claim 4, wherein said slider has a cam surface engageable by an unlock member insertable through a hole defined in said bottom wall of the tape cassette for moving said reel lock assembly to said unlock position, said bottom wall having a recess defined therein, said slider being slidably disposed in said recess.

6. A tape cassette assembly according to claim 5, wherein said recess has an end engageable with said slider when said reel lock assembly is displaced to said unlock position, for releasing said engaging members from engagement with the teeth on both of the tape reels.

7. A tape cassette assembly according to claim 4, wherein said twistable joint is joined to an upper end of said slider remote from said bottom wall of the tape cassette.

8. A tape cassette assembly according to claim 4, further including a pair of vertical walls disposed on said bottom wall of the tape cassette, said vertical walls being lower than respective upper portions of said lock arms, said slider being slidably guided by said vertical walls in said tape cassette.

9. A tape cassette assembly comprising:
a tape cassette having a front end, a rear end, a bottom wall, and a pair of tape reels rotatably mounted about respective axes substantially perpendicular to said bottom wall;
a reel lock mechanism for locking said pair of tape reels against rotation in the tape cassette to prevent a tape wound around and extending between the tape reels from being loosened, said reel lock mechanism comprising:
a reel lock assembly movable between said reels in a forward direction towards said reels to a lock position to lock the tape reels against rotation and in a rearward direction away from said reels to an unlock position to unlock the tape reels for rotation;
said reel lock assembly comprising:
a slider slidably supported on said bottom wall in the tape cassette for sliding movement in said directions between said lock and unlock positions, said slider having a front surface and a width across said front surface;
a lock body having a central portion and a pair of lock arms integrally coupled to and extending from said central portion, said lock arms having respective engaging members joined thereto that are respectively engageable with teeth on outer circumferential edges of the tape reels, said central portion having a rear surface; and
a twistable joint extending in a direction substantially parallel to the directions of said sliding movement, said twistable joint integrally joined between said rear surface of said central portion and said front surface of said slider, said twistable joint having a constricted width that is substantially narrower than the width of said front surface of said slider to allow the lock body to rock with respect to the slider about an axis substantially perpendicular to said bottom wall;
wherein, in the lock position, when one of the tape reels is turned in a direction to loosen the tape, the corresponding engaging member is displaced by one of the teeth on said one of the tape reels, twisting said joint to press the other engaging member against one of the teeth on the other tape reel for thereby turning the other tape reel in a direction to tension the tape.

* * * * *